United States Patent

Potin et al.

[15] 3,639,969
[45] Feb. 8, 1972

[54] METHOD AND DEVICE FOR MAKING AND FINISHING ZIP FASTENERS

[72] Inventors: Marcel Potin, Choisy-le-Roi, France;
[73] Assignee: Societe Financiere Francaise De Licences Et Brevets, Choisy-Le Roi (Val de Marne), France
[22] Filed: Jan. 6, 1970
[21] Appl. No.: 912

[30] Foreign Application Priority Data

Jan. 8, 1969 France.................................6900119

[52] U.S. Cl.................................29/408, 29/207.5, 228/1
[51] Int. Cl...................B23p 11/00, B23p 19/04, B23k 1/06
[58] Field of Search..................29/408, 207.5 ST, 207.5 SL, 29/207.5, 410; 228/1

[56] References Cited

UNITED STATES PATENTS 3,340,594 9/1967 Frolich et al. ..............29/207.5 ST X Primary Examiner—Thomas H. Eager
Attorney—Arthur B. Colvin

[57] ABSTRACT

Method of manufacturing and finishing a zip fastener from a section taken from a continuous chain comprising two rows of coupling members of synthetic material carried by a pair of parallel tapes. This method consists in causing a tool to be lowered upon the position contemplated for constituting the "closed" end of the zip fastener to be completed, said tool being vibrated at supersonic frequency and having its operative end formed on the one hand with a projecting ridge extending across the full width of the chain and on the other hand a central protrusion registering with the two rows of coupling members, said tool being so positioned and directed that said protrusion lies on the side of the fastener's section being finished. The device according to the present invention consists essentially of a tool as described hereinabove.

6 Claims, 13 Drawing Figures

PATENTED FEB 8 1972
3,639,969
SHEET 1 OF 2
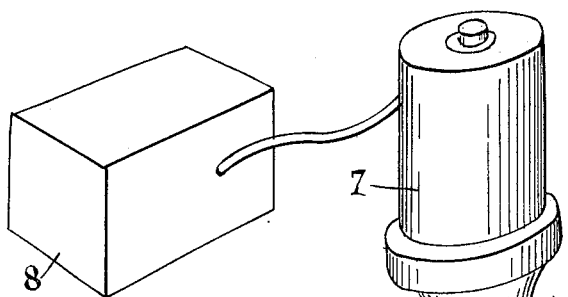
Fig.1
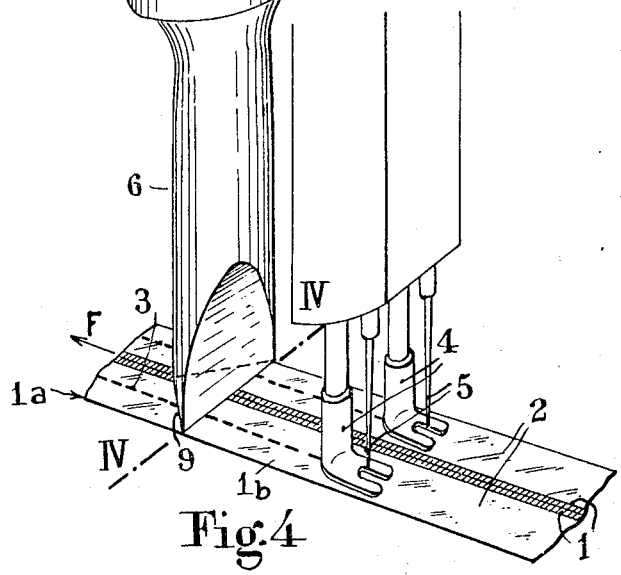
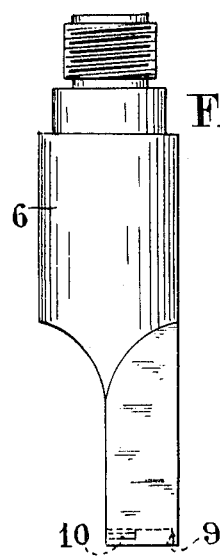
Fig.2
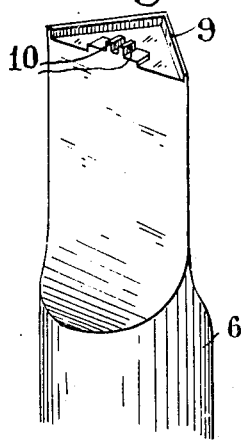
Fig.3
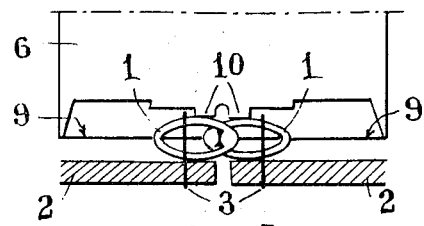
Fig.5
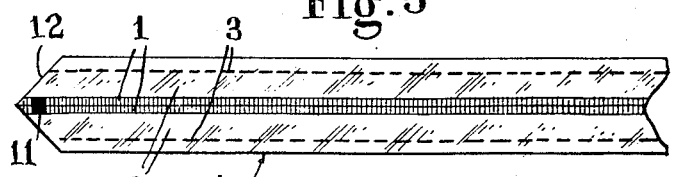
Fig.6
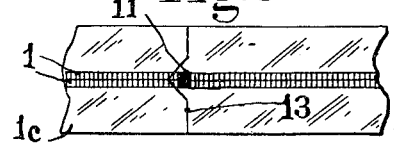
INVENTOR
MARCEL POTIN
By
ATTORNEY

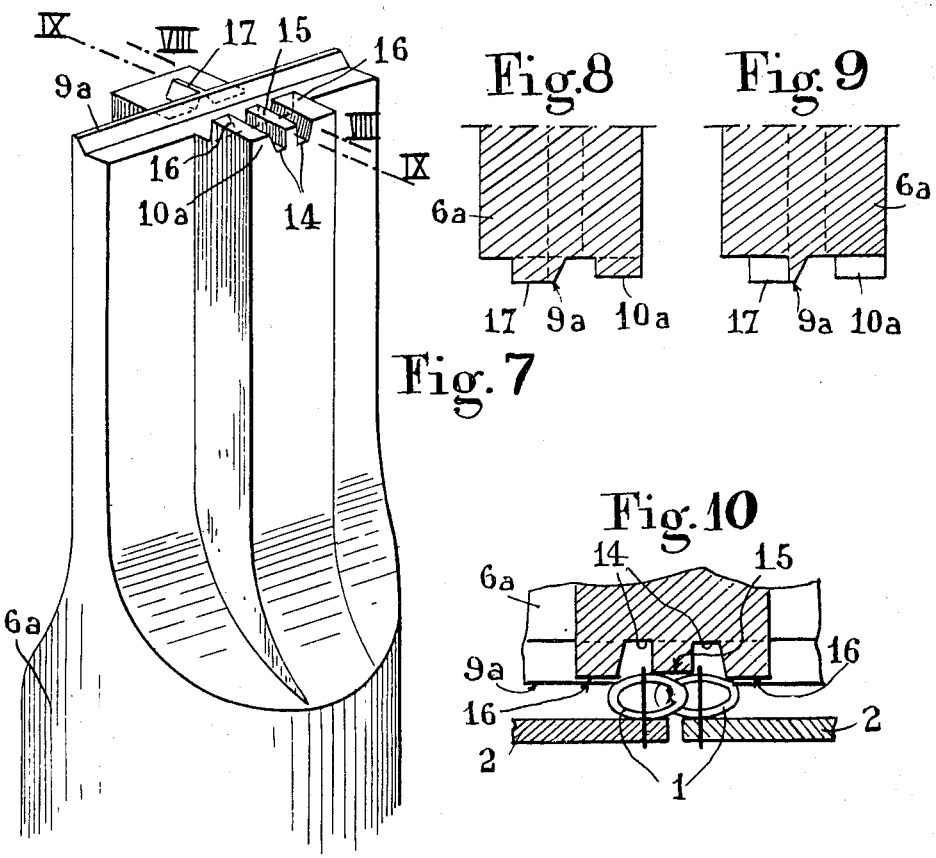
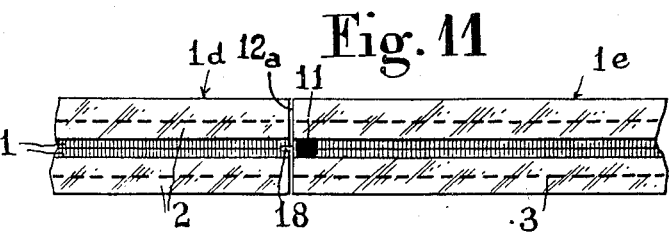
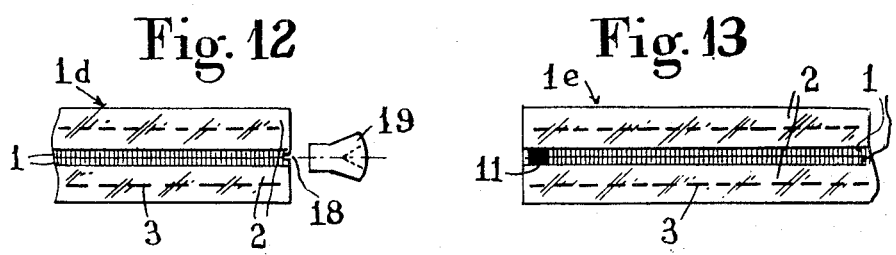

METHOD AND DEVICE FOR MAKING AND FINISHING ZIP FASTENERS

The present invention relates to the manufacture of zip or slide fasteners from a continuous chain comprising two rows of coupling members of synthetic material which are secured to a pair of parallel carrier tapes.

To make separate zip fasteners of predetermined length this continuous chain must of course be cut into successive sections and each section provided with a slide and also with stop members at both ends. To this end, a number of methods have already been proposed for performing these various steps, in any predetermined order or sequence.

It is the object of the present invention to simplify considerably the manufacture of zip fasteners from a continuous chain by simultaneously cutting same and forming a terminal stop member, namely the one provided at the end of each fastener which remains closed, i.e., the end usually referred to as "the lower end."

To this end, the present invention aims firstly at providing a method of manufacturing and finishing a zip fastener from a section taken a continuous chain comprising two rows of coupling members of synthetic material carried by a pair of parallel tapes, this method being characterized in that it consists in causing a tool to be lowered upon the position contemplated for constituting the "closed end" of the zip fastener to be completed, said tool being vibrated at supersonic frequency and having its operative end formed on the one hand with a projecting ridge extending across the full width of the chain and on the other hand a central protrusion registering with the two rows of coupling members, said tool being so positioned and directed that said protrusion lies on the side of the fastener's section being finished, whereby the actuation of this tool will perform simultaneously, in a single and same operation, on the one hand the welding of the coupling members at the closed end of the fastener constituted by said section and on the other hand the cutting of the tapes beyond said welding point, therefore at the limit of the section to be removed from the chain.

The vibrating tool utilized according to this method consists of a metal member of substantially mandrel configuration and having such characteristics that its operative end is capable of transmitting supersonic vibration to the objects engaged thereby. Of course, this vibrating tool is mounted at its opposite end to a generator of supersonic vibration. Therefore, the vibrating tool thus contemplated is of the type commonly referred to as "sonotrode."

As a consequence of the engagement of this vibrating tool with the continuous chain of zip or slide fasteners, there is obtained in a same and single operation on the one hand the welding of the coupling members as a consequence of the supersonic vibration transmitted through the central protrusion of said tool and on the other hand the transverse cutting of said chain as a consequence of the supersonic vibration transmitted through the transverse ridge of said tool. Now the welding of the coupling members at the point contemplated constitutes an efficient way of definitely assembling and stopping the closed end of the fastener during the manufacturing process. In fact, this tool has the twofold purpose of assembling or welding the coupling members at the selected point of the chain and stopping the slide controlling the fastener.

Under these conditions, it is clear that the method of this invention is adequate for efficiently obtaining in a same and single operation the stop element of the closed end of a fastener and the transverse cutting of the continuous chain of fasteners.

This invention is also concerned with a device specially designed for carrying out the method disclosed hereinabove, this device consisting essentially of a member adapted to transmit supersonic vibration and provided with the above-described characteristics.

Other features and advantages of the method and device of this invention will appear as the following description proceeds with reference to the attached drawing given by way of example and wherein:

FIG. 1 is a diagrammatic perspective view of an arrangement utilizing the tool of this invention, associated with a twin-needle sewing machine;

FIG. 2 is an elevational view of the vibrating tool contemplated in this arrangement;

FIG. 3 is a perspective view showing the free or operative end of this tool;

FIG. 4 is a diagrammatic sectional view taken along the line IV—IV of FIG. 1 and illustrating the mode of operation of the arrangement;

FIG. 5 is a plane view from above showing a slide or zip fastener obtained from a continuous chain by using the method and device of this invention;

FIG. 6 is a fragmentary plane view from above showing a modified form of embodiment of this slide fastener;

FIG. 7 is a perspective view showing the free end of the vibrating tool according to another form of embodiment of the device of this invention;

FIGS. 8 and 9 are fragmentary sections taken along the lines IX—13 and X—X of FIG. 8;

FIG. 10 is a diagrammatic cross-sectional view illustrating the mode of operation of this tool;

FIG. 11 is a plane view from above showing two adjacent zip fasteners obtained from a same continuous chain by means of the device of this invention, and FIGS. 12 and 13 are fragmentary plane views from above showing the adjacent ends of these two adjacent zip fasteners.

In the example illustrated in FIG. 1 the device or tool according to this invention is associated with a twin-needle sewing machine to constitute an arrangement for securing zip fasteners obtained from a continuous chain comprising two rows of coupling members 1 of synthetic material and a pair of tapes 2 supporting these members.

The sewing machine utilized in this arrangement is adapted to secure simultaneously and in a manner already known per se the pair of parallel carrier tapes 2 to the edges of any desired article consisting, for example, of a garment or any other article comprising two portions of which marginal portions must be adapted to be assembled and disassembled by means of a slide fastener. Thus, the pair of carrier tapes 2 are secured to the corresponding edges or marginal portions of this article by means of two seams 3. To simplify the drawing, only the two presser feet 4 and twin needles 5 of this machine are shown in FIG. 1.

The device according to this invention consists essentially of a metal mandrel 6 adapted to transmit supersonic vibration of predetermined frequency to the parts which its operative or free end is caused to engage. This mandrel constitutes a vibrator of the type usually referred to as a "sonotrode."

This member is mounted on a vibration generator 7 of any suitable type, adapted to transmit supersonic vibration thereto. This generator is supplied in turn with high-frequency electric current from a generator 8 of current of this character, which may be common to a plurality of devices according to this invention.

The vibrator 6 is disposed vertically above the continuous chain of zip fasteners and is somewhat spaced from the twin needles 5 of the sewing machine. In relation to these needles, the vibrator is disposed on the side toward which the chain is fed (i.e., in the direction of the arrow F), during the securing and finishing operations to be performed.

On the other hand, the casing 7 of the vibration generator 7 which carries this tool is secured to a movable support or stand adapted to be moved vertically by means of adequate control means (not shown) so that the free or operative end of the vibrating tool may be lowered periodically for engagement with the chain of zip fasteners and subsequent movement away therefrom.

At its operative or free end the vibrating member or tool 6 comprises a ridge 9 extending throughout the width of the continuous chain of zip fasteners. This ridge may be rectilinear or V-shaped as in the example illustrated.

This end further comprises, on the other hand a central protrusion registering with or overlying a pair of coupling members 1 of the zip fastener. This protrusion may have somewhat the shape of a small punch having a continuous, plain surface. However, it may be also comprise two well-defined portions 10 constituting a pair of parallel ribs adapted to engage the coupling members 1 of the zip fastener. It may be noted that the orientation of the vibrating tool 6 is such that this protrusion 10 lies between the ridge 9 and the needles 5 of the sewing machine.

As already mentioned hereinabove the continuous chain of zip fasteners is fed in the direction of the arrow F either continuously or intermittently. This chain is thus caused to travel under the needles 5 of the sewing machine and subsequently under the vibrating tool 6, the latter being normally held somewhat spaced from the chain. However, during the translation of this chain the needles 5 of the sewing machine continue their operation and stitch the pair of carrier tapes 2 to the edges of the article to be provided with a zip fastener.

For cutting off a zip fastener 1a of predetermined length, it is only necessary to press the operative end of the vibrating tool 6 against the continuous surface when the position contemplated for constituting the end of the zip fastener registers with the lower end of the tool 6. During the engagement between the tool 6 and chain 1 the ridge 9 of the vibrating tool 6 cuts the chain throughout its width along a broken line 12. In face, the vibration transmitted by this ridge to the pair of carrier tapes 2 is attended by the cutting thereof. This cutting action may be purely mechanical if these tapes consist of natural textile material. However, this cutting action may also be obtained by fusion in case these tapes consist wholly or partly of synthetic textile material.

However, during this operation the central protrusion 10 of the vibrating tool 6 transmits on the other hand supersonic vibration to the coupling members 1 of the next zip fastener 1b at the closed end thereof. Since these coupling members consist of synthetic material the vibration applied thereto cause the instantaneous and localized melting thereof and therefore the welding of these members in mutual contact at the corresponding location 11. Now this connection constitute somewhat the equivalent of the junction and stop member usually provided at the closed end of a zip fastener for the dual purpose of joining the two portions of this fastener and stopping the control slide thereof when utilizing the zip fastener.

Under these conditions, by using a single vibrating member or tool 6, there is obtained simultaneously both the formation of the end pieces 11 necessarily incorporated in the closed end of a zip fastener and the separation of this zip fastener 1b from the preceding one 1a previously provided with an end stop 11 at its opposite end.

If the carrier tapes 2 contain yarns or other elements of synthetic material, these are not only cut but locally molten along this line. Now this localized fusion or melting is particularly useful in that it will efficiently prevent any subsequent ravel out of the tapes.

It may emphasize that the junction member 11 thus formed at the closed end of zip fastener 1a was obtained without supplying any additional material, in contrast to what is observed in certain conventional and known methods consisting essentially in moulding a complementary plastic element thereover to provide this junction member.

Of course, the vibrating tool 6 must subsequently be moved away from the continuous chain 1 after obtaining the closing section during the melting and forming of the end or junction member 11. Besides, this vibrating tool 6 may be allowed to vibrate permanently since its action is effective only when the operative end of the tool is sufficiently close to the chain of zip fasteners. However, it is also possible to so arrange the elements that this tool vibrates only when it is brought into proper engagement with the chain of zip fasteners.

Furthermore, the device of this invention may be embodied with many modifications and variations, the above-described form of embodiment constituting only a example given by way of illustration.

FIG. 6 illustrates a zip fastener section 1c having at its closed end a different configuration or cut line 13 in comparison with the form of embodiment depicted in FIG. 5.

However, this cut line 13 may also be rectilinear, and in this case it is perpendicular to the longitudinal centerline of the zip fastener. FIGS. 7 and 10 illustrate a specific form of embodiment of the vibrating tool designed to this end and characterized by a few additional properties.

This tool comprises a metal mandrel 6a carrying at its free end a projecting knife edge 9a extending throughout the width of the continuous chain 1, 2 of zip fasteners. However, in contrast to the preceding form of embodiment this knife edge 9a is perfectly rectilinear and extends at right angles to the longitudinal centerline of the chain 1, 2.

On one of the two portions of the tool end which are separated by this knife edge 9a a central welding protrusion is provided. Unlike the one shown in the preceding form of embodiment, this central welding protrusion comprises a pair of channels or grooves 14 extending in a longitudinal direction on either side of an intermediate flat portion 15. Thus, this protrusion also comprises a pair of lateral faces 16.

The intermediate face 15 extends above the longitudinal centerline of the continuous chain of zip fasteners 1, 2 in order to constitute a surface adapted to transmit the supersonic vibration causing the welding of the coupling members 1 at the end of a given zip fastener.

The width of said channels or grooves 14 is such that the two lateral faces 16 are positioned externally of the convex surface of coupling members 1, and said central face 15 slightly engages a groove formed between the two rows of coupling members (see FIG. 10). This arrangement facilitates considerably the proper positioning of the coupling member and the holding thereof against motion during the welding thereof at the end of the predetermined zip fastener length 1e.

According to another improvement, the end of this vibrating tool 6a comprises on the side opposite to said protrusion 10a a longitudinal and relatively short rib 17. This rib 17 merges into the middle of the transverse cutting knife edge 9a. Besides, this short rib 17 extends above the longitudinal centerline of the continuous chain of zip fasteners 1, 2.

As in the case of the transverse knife edge 9a, the longitudinal short rib 17 has a relatively acute cross-sectional contour in order to act as a cutting edge by virtue of the supersonic vibration applied thereto.

Under these conditions, when this vibrating tool 6a is caused to engage a predetermined point along the continuous chain of zip fasteners 1, 2, there is obtained in succession:

1. a transverse cutting line 12a extending across both the tapes 2 and the two rows of coupling members 1; this cutting line produced by the supersonic vibration transmitted through the transverse knife edge 9a causing the two adjacent sections 1d and 1e of the continuous chain 1, 2 to be separated from each other, these sections being subsequently removed to constitute two separate zip fasteners;

2. a weld spot 11 caused by the joint melting of coupling members pertaining to the two rows and lying at the position contemplated, i.e., at the closed end of the zip fastener section 1e.

This weld spot, adapted to constitute the endpiece of the zip fastener, is obtained by means of the supersonic vibration transmitted through the central face 15 and the lateral faces 16 of protrusion 10a of the vibrating tool 6a.

3. Finally, a longitudinal notch 18 of relatively short length, which extends between the two rows of coupling members 1 of the adjacent zip fastener section 1d, this notch also resulting from the supersonic vibration transmitted via the longitudinal short rib 17 of vibrating tool 6a.

Now the function of this last-named notch is to facilitate the positioning of the control slide 19 on the two rows of coupling members 1 of the corresponding section 1d (see FIG. 12).

With the improved features thus embodied in the vibrating tool it is thus possible to produce at the same time a separation of a pair of adjacent zip fastener sections, the junction member of one end of a predetermined zip fastener and a notch in the adjacent end of the next zip fastener section in order to facilitate the insertion of a slide into this section.

Of course, the vibrating tool described hereinabove and illustrated in the accompanying drawing may also be used in a zip fastener securing the finishing arrangement of the type illustrated in FIG. 1.

However, this device may also be used separately for cutting off zip fasteners from a continuous chain or line of zip fasteners while finishing one end of these fasteners. The zip fasteners thus cut off from said chain can be stored for subsequent sale and use at any desired time.

What is claimed as new is:

1. Method of manufacturing and finishing a zip fastener from a section taken from a continuous chain comprising two rows of coupling members of synthetic material carried by a pair of parallel tapes, this method being characterized in that it consists in causing a tool to be lowered upon the position contemplated for constituting the "closed" end of the zip fastener to be completed, said tool being vibrated at supersonic frequency and having its operative end formed on the one side with a projecting ridge extending across the full width of the chain and on the other side a central protrusion registering with the two rows of coupling members, said tool being so positioned and directed that said protrusion lies on the side of the fastener being finished, whereby the actuation of this tool will perform simultaneously in a single and same operation on the one hand the welding of the coupling members at the closed end of the fastener being finished and on the other hand the cutting of the tapes beyond said welding point, therefore at the limit of the fastener to be removed from the chain.

2. A device for welding and cutting zip fasteners from a continuous chain comprising two rows of coupling members of synthetic material carried by a pair of parallel tapes, said device comprising a tool vibrated at supersonic frequency and formed at its operative end on the one side with a projecting cutting ridge extending across the full width of the corresponding chain of zip fasteners, and on the other side with a central welding protrusion registering with the two rows of coupling members forming part of said chain.

3. A device according to claim 2, characterized in that the aforesaid tool consists of a metal mandrel carried by an electric apparatus for generating supersonic vibration which is connected to a high-frequency generator.

4. A device according to claim 2, characterized in that the operative end of the tool on the side opposite to said welding protrusion, comprises a relatively short cutting rib extending parallel to the longitudinal centerline of the zip fastener, said cutting ridge extending transversely across the operative end of the tool, between said welding protrusion and said cutting rib, said cutting rib being adapted to form a parting notch between the coupling members of the two rows of coupling members at the point of the open end of the zip fastener adjacent to the zip fastener closed at the same time by said tool by welding the relevant coupling members.

5. A device according to claim 2, characterized in that the central protrusion provided on the operative end of said tool comprises a pair of longitudinal channels disposed on either side of a central portion, said channels being adapted to properly position and hold the relevant coupling members against movement.

6. An arrangement for securing and finishing zip fasteners consisting of sections cut off in succession from a continuous chain which comprises two rows of coupling members of synthetic material secured to a pair of parallel carrier tapes, this arrangement being characterized in that it comprises in combination on the one hand a twin-needle sewing machine adapted to secure simultaneously the pair of carrier tapes of said chain to the marginal portions of a given article to be provided with a zip fastener, on the other hand an operating tool vibrated at supersonic frequency and formed at its operative end on the one side with a projecting cutting ridge extending across the full width of the corresponding chain of zip fasteners, and on the other side with a central welding protrusion registering with the two rows of coupling members forming part of said chain, said tool being longitudinally spaced from the twin needles of the sewing machine, and positioned on the side of said needles from which the continuous chain is discharged after the operation of the sewing machine, the welding protrusion carried by the operative end of said tool being positioned adjacent to said sewing needles.

* * * * *